(12) United States Patent
Kim et al.

(10) Patent No.: US 11,575,974 B2
(45) Date of Patent: Feb. 7, 2023

(54) ELECTRONIC DEVICE AND METHOD FOR CONTROLLING ELECTRONIC DEVICE

(71) Applicant: SAMSUNG ELECTRONICS CO., LTD., Suwon-si (KR)

(72) Inventors: Sejun Kim, Suwon-si (KR); Kibo Kim, Suwon-si (KR); Taedon Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/278,530

(22) PCT Filed: Jul. 2, 2019

(86) PCT No.: PCT/KR2019/008012
§ 371 (c)(1),
(2) Date: Mar. 22, 2021

(87) PCT Pub. No.: WO2020/075952
PCT Pub. Date: Apr. 16, 2020

(65) Prior Publication Data
US 2022/0038788 A1    Feb. 3, 2022

(30) Foreign Application Priority Data

Oct. 12, 2018    (KR) .................. 10-2018-0121661

(51) Int. Cl.
*H04N 21/63*   (2011.01)
*H04N 21/4363*   (2011.01)
(Continued)

(52) U.S. Cl.
CPC ..... *H04N 21/631* (2013.01); *H04N 21/43637* (2013.01); *H04N 21/4425* (2013.01);
(Continued)

(58) Field of Classification Search
CPC .......... H04N 21/631; H04N 21/43637; H04N 21/440281; H04N 21/4425;
(Continued)

(56) References Cited

U.S. PATENT DOCUMENTS 5,802,241 A * 9/1998 Oshima ............ H04N 21/64792
375/E7.091
7,580,612 B2   8/2009 Sato et al.
(Continued)

FOREIGN PATENT DOCUMENTS

JP    4615958    1/2011
KR    10-0380230    4/2003
(Continued)

OTHER PUBLICATIONS

International Search Report for PCT/KR2019/008012 dated Oct. 15, 2019, 2 pages.
(Continued)

*Primary Examiner* — James R Sheleheda
(74) *Attorney, Agent, or Firm* — Nixon & Vanderhye, P.C.

(57) ABSTRACT

Disclosed are an electronic device and a method for controlling the electronic device. Specifically, the electronic device according to the present disclosure receives a first image signal and a second image signal which are separated from an original image signal through a first channel and a second channel having different frequency bandwidths, and which have different data rates. When the first image signal and the second image signal are received, the electronic device determines whether an error exists in the second image signal, obtains a first output image signal and a second output image signal on the basis of the first image signal and the second image signal according to a result of
(Continued)

the determination, and outputs the obtained first output image signal or second output image signal.

11 Claims, 11 Drawing Sheets

(51) Int. Cl.
  *H04N 21/4402* (2011.01)
  *H04N 21/4425* (2011.01)
  *H04N 21/462* (2011.01)
  *H04N 21/647* (2011.01)

(52) U.S. Cl.
  CPC ............ *H04N 21/440227* (2013.01); *H04N 21/440281* (2013.01); *H04N 21/4621* (2013.01); *H04N 21/4622* (2013.01); *H04N 21/6473* (2013.01)

(58) Field of Classification Search
  CPC .......... H04N 21/4621; H04N 21/4622; H04N 21/6473; H04N 21/440227; H04N 21/440263
  See application file for complete search history.

(56) References Cited

U.S. PATENT DOCUMENTS

| | | | |
|---|---|---|---|
| 8,661,491 B1 * | 2/2014 | Alexander | H04N 21/6125 |
| | | | 725/116 |
| 8,861,326 B2 | 10/2014 | Zheng et al. | |
| 9,077,966 B2 | 7/2015 | Horlander | |
| 9,716,899 B2 | 7/2017 | Thirumalai et al. | |
| 10,091,553 B1 * | 10/2018 | Bertz | H04N 21/4331 |
| 10,319,334 B2 | 6/2019 | Oh | |
| 2005/0100091 A1 | 5/2005 | Hanamura et al. | |
| 2006/0083315 A1 * | 4/2006 | Sato | H04N 21/440263 |
| | | | 375/240.12 |
| 2006/0209745 A1 | 9/2006 | MacMullan et al. | |
| 2006/0233253 A1 * | 10/2006 | Shi | H04N 19/159 |
| | | | 375/E7.193 |
| 2006/0233254 A1 * | 10/2006 | Lee | H04N 19/61 |
| | | | 375/240.03 |
| 2007/0230564 A1 * | 10/2007 | Chen | H04N 19/61 |
| | | | 375/E7.199 |
| 2009/0135311 A1 | 5/2009 | Kurita et al. | |
| 2009/0268665 A1 * | 10/2009 | Yousef | H04W 64/00 |
| | | | 370/328 |
| 2012/0076204 A1 * | 3/2012 | Raveendran | H04N 21/631 |
| | | | 375/E7.021 |
| 2012/0281142 A1 | 11/2012 | Pettersson et al. | |
| 2013/0279606 A1 * | 10/2013 | Vanam | H04N 19/166 |
| | | | 375/240.27 |
| 2015/0341646 A1 | 11/2015 | Sze et al. | |
| 2016/0219606 A1 | 7/2016 | Amano et al. | |
| 2018/0063218 A1 | 3/2018 | Kim et al. | |

FOREIGN PATENT DOCUMENTS

| | | | |
|---|---|---|---|
| KR | 10-2012-0070833 | 7/2012 | |
| KR | 10-1391683 | 5/2014 | |
| KR | 10-1549922 | 9/2015 | |
| KR | 10-2017-0028165 | 3/2017 | |
| KR | 10-2017-0119131 | 10/2017 | |
| KR | 10-2018-0021997 | 3/2018 | |
| WO | WO-2010095984 A1 * | 8/2010 | ..... H04N 21/234327 |

OTHER PUBLICATIONS

Written Opinion of ISA for PCT/KR2019/008012 dated Oct. 15, 2019, 9 pages.

* cited by examiner

ELECTRONIC DEVICE AND METHOD FOR CONTROLLING ELECTRONIC DEVICE

This application is the U.S. national phase of International Application No. PCT/KR2019/008012 filed Jul. 2, 2019 which designated the U.S. and claims priority to KR Patent Application No. 10-2018-0121661 filed Oct. 12, 2018, the entire contents of each of which are hereby incorporated by reference.

FIELD

This disclosure relates to an electronic device and a controlling method of an electronic device and, more particularly, to an electronic device capable of receiving an image signal wireless and a controlling method thereof.

DESCRIPTION OF RELATED ART

In a technical field of wireless transmission of an image signal, a performance and a utilization range may vary according to the frequency bandwidth of a channel for wireless communication.

For example, a channel having a frequency bandwidth of 5 GHz has an advantage of being robust to an obstacle, or the like, due to a diffraction characteristic of a radio frequency (RF), but it is impossible to transmit a high-quality image of 4K or higher without deterioration, due to a limitation of the bandwidths.

A channel having frequency bandwidths of 60 GHz may transmit a high definition image signal according to use of a wide bandwidth, but is vulnerable to an obstacle or the like. Therefore, there is a limit in a use environment such as a Room to Room.

Accordingly, there is a need for a technology capable of wirelessly transmitting a high-definition image, receiving the image, and stably outputting the image.

SUMMARY

The disclosure has been made to solve the above-described problems, and an object of the disclosure is to provide an electronic device capable of wirelessly receiving a high-resolution image and stably outputting the same and a controlling method thereof.

According to an embodiment, an electronic device includes an outputter, a communicator configured to perform wireless communication with an external device through a first channel and a second channel, and a processor configured to receive a first image signal separated from an original image signal through a first channel of the communicator, receive a second image signal separated from the original image signal through a second channel of the communicator, based on identification that an error exists in the second image signal received through the second channel, control the outputter to output a first output signal obtained by changing a data rate of the first image signal, and based on identification that an error does not exist in the second image signal received through the second channel, control the outputter to output a second output signal obtained based on the first image signal and the second image signal.

The first channel may have a first frequency bandwidth, and the second channel may have a second frequency bandwidth higher than the first frequency bandwidth, and the first image signal may have a first data rate, and the second image may have a second data rate higher than the first image signal.

The second image signal may be composed of an active interval in which pixel data is transmitted and a blank interval in which the pixel data is not transmitted, and the processor may identify whether an error exists in the second image signal in the blank interval.

The processor may, based on a bit error rate of the second image signal being greater than or equal to a preset ratio, identify that an error exists in the second image signal.

The second image signal may have a second frame rate higher than a first frame rate of the first image signal.

The first output signal may be obtained by inserting an interpolation frame between a plurality of frames included in the first image signal so as to have a same frame rate as the original image signal.

The second output signal may be obtained by merging a plurality of frames included in the first image signal and a plurality of frames included in the second image signal so as to have a same frame as a plurality of frames included in the original image signal.

The second image signal may have second pixel data larger than first pixel data of the first image signal.

The communicator may perform communication with the external device through a third channel for wireless communication of a third frequency bandwidth higher than the second bandwidth, the first channel, and the second channel, the processor may receive a third image signal separated from the original image signal through a third channel of the communicator and having a third data rate higher than the second data rate, based on identification that an error does not exist in a third image signal received through the third channel, may control the outputter to output a third output signal obtained based on the first image signal, the second image signal, and the third image signal, based on identification that an error exists in the third image signal received through the third channel and an error does not exist in the second image signal received through the second channel, may control the outputter to output a second output signal obtained based on the first image signal and the second image signal, and based on identification that an error exists in the third image signal received through the third channel and an error exists in the second image signal received through the second channel, may control the outputter to output a first output signal obtained by changing a data rate of the first image signal.

According to an embodiment, a method of controlling an electronic device includes receiving a first image signal separated from an original image signal through a first channel for wireless communication, receiving a second image signal separated from the original image signal through a second channel for wireless communication, identifying whether an error exists in a second image signal received through the second channel, based on identification that an error exists in the second image signal received through the second channel, outputting a first output signal obtained by changing a data rate of the first image signal, and based on identification that an error does not exist in the second image signal received through the second channel, outputting a second output signal obtained based on the first image signal and the second image signal.

The first channel may have a first frequency bandwidth, and the second channel may have a second frequency bandwidth higher than the first frequency bandwidth, and the first image signal may have a first data rate, and the second image may have a second data rate higher than the first image signal.

The second image signal may be composed of an active interval in which pixel data is transmitted and a blank interval in which the pixel data is not transmitted, and the identifying may include identifying whether an error exists in the second image signal in the blank interval.

The identifying may include, based on a bit error rate of the second image signal being greater than or equal to a preset ratio, identifying that an error exists in the second image signal.

The second image signal may have a second frame rate higher than a first frame rate of the first image signal.

The outputting the first output signal may include obtaining by inserting an interpolation frame between a plurality of frames included in the first image signal so as to have a same frame rate as the original image signal.

The outputting the second output signal may include obtaining by merging a plurality of frames included in the first image signal and a plurality of frames included in the second image signal so as to have a same frame as a plurality of frames included in the original image signal.

The second image signal may have second pixel data larger than first pixel data of the first image signal.

DETAILED DESCRIPTION OF EXAMPLE EMBODIMENTS

Figure 1A:
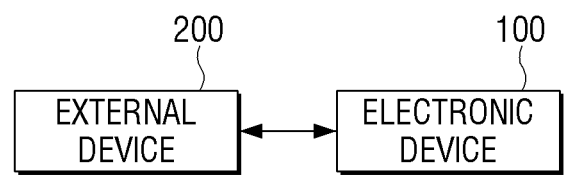
FIG. 1A is a diagram briefly illustrating a communication system according to an embodiment.

Hereinafter, embodiments of the disclosure will be described with reference to the accompanying drawings. However, it may be understood that the disclosure is not limited to the embodiments described hereinafter, but also includes various modifications, equivalents, and/or alternatives of the embodiments of the disclosure. In relation to explanation of the drawings, similar drawing reference numerals may be used for similar constituent elements.

In describing the disclosure, if it is identified that a specific description of the relevant known function or configuration may unnecessarily obscure the gist of the disclosure, a detailed description thereof will be omitted.

In addition, the following embodiments may be modified in many different forms, and the scope of the technical spirit of the disclosure is not limited to the following examples. Rather, these embodiments are provided so that this disclosure will be thorough and complete, and will fully convey the technical spirit to those skilled in the art.

The terms used herein are to describe certain embodiments and are not intended to limit the scope of claims. A singular expression includes a plural expression unless otherwise specified.

In this specification, the expressions "have," "may have," "include," or "may include" or the like represent presence of a corresponding feature (for example: components such as numbers, functions, operations, or parts) and does not exclude the presence of additional feature.

In this document, expressions such as "at least one of A [and/or] B," or "one or more of A [and/or] B," include all possible combinations of the listed items. For example, "at least one of A and B," or "at least one of A or B" includes any of (1) at least one A, (2) at least one B, or (3) at least one A and at least one B.

As used herein, the terms "first," "second," or the like may denote various components, regardless of order and/or importance, and may be used to distinguish one component from another, and does not limit the components.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

The disclosure will be described in detail with reference to the accompanying drawings so that those skilled in the art can easily work the invention. The disclosure may, however, be embodied in many different forms and should not be construed as limited to the embodiments set forth herein. In the drawings, the parts not related to the description are omitted to specify the invention and same reference numerals are used throughout the specification to refer to the same or similar parts.

Figure 1B:
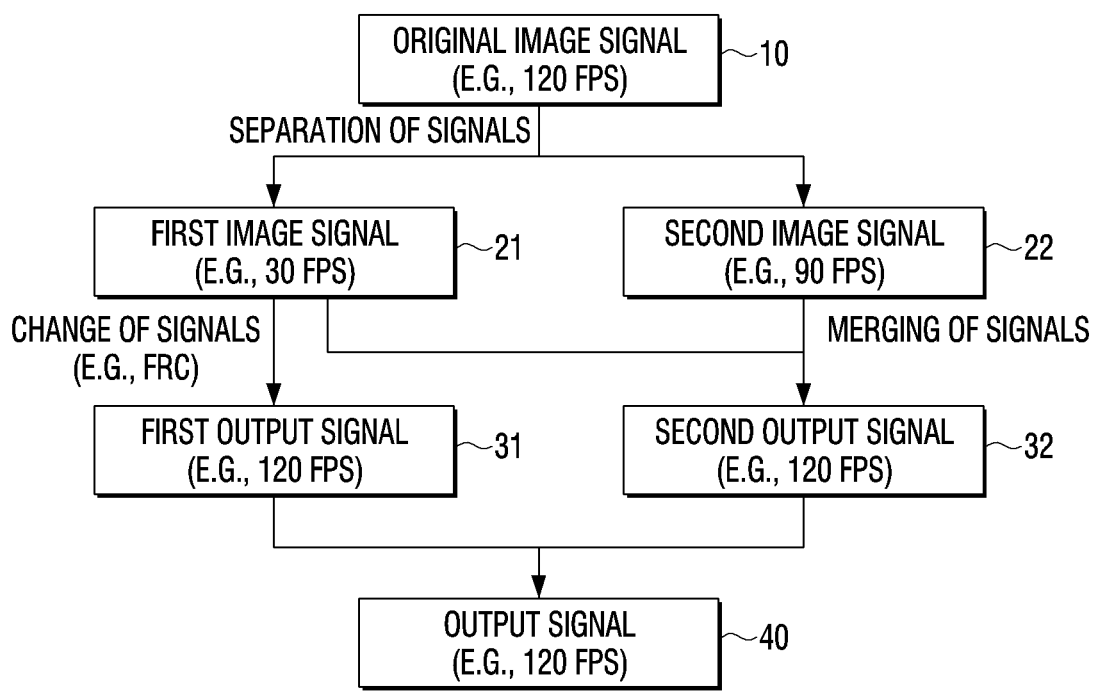
FIG. 1B is a diagram briefly illustrating a process for processing an image signal according to an embodiment.

FIG. 1A is a diagram briefly illustrating a communication system according to an embodiment and FIG. 1B is a diagram illustrating a process for processing an image signal according to an embodiment.

As illustrated in FIG. 1A, a communication system includes an electronic device 100 and an external device 200.

The electronic device 100 according to the disclosure may be a display device such as a digital television (TV), a monitor, a projection TV, or the like, or may be a device for receiving an image signal from the external device 200, such as a set-top box (STB), and outputting an image signal to an external display device (not shown).

The external device 200 according to the disclosure may be implemented as a server as well as various types of electronic devices 100 having a function capable of transmitting an image signal.

The electronic device 100 may receive an image signal from the external device 200. The external device 200 may separate the input original image signal 10 into a first image signal 21 and a second image signal 22, and transmit the signal to the electronic device 100. The electronic device 100 may receive the first image signal 21 and the second image signal 22 from the external device 200.

The first image signal 21 has a first data rate, and the second image signal 22 has a second data rate higher than the first data rate. The data rate may refer to the amount of data transmitted for one second. The second image signal 22 has a higher data rate compared to the first image signal 21, and may output a relatively high-definition image when outputting an image based on the second image signal 22 than when outputting an image based on the first image signal 21.

The first image signal 21 may have a first frame rate and the second image signal 22 may have a second frame rate higher than the first frame rate. Here, the frame rate refers to the number of frames displayed for one second.

For example, the original image signal 10 may have a frame rate of 120 frame per second (fps). The original image signal 10 of 120 fps may be separated into the first image signal 21 having a frame rate of 30 fps and the second image signal 22 having a frame rate of 90 fps.

When the first image signal 21 and the second image signal 22 are received, the electronic device 100 may output a first output signal 31 and a second output signal 32 obtained based on the received first image signal 21 and the second image signal 22.

If it is determined that an error exists in the received second image signal 22, the electronic device 100 may output the first output signal 31 obtained by changing the data rate of the first image signal 21.

If it is determined that an error exists in the received second image signal 22, the electronic device 100 may output the first output signal 31 by using only the first image signal 21 without using the second image signal 22.

The first output signal 31 may be obtained by inserting an interpolation frame between a plurality of frames included in the first image signal 21 so as to have the same frame rate as the original image signal 10.

For example, if the electronic device 100 determines that an error exists in the received second image signal 22, the electronic device 100 may obtain a first output signal 31 having a frame rate of 120 fps which is the same as the original image signal 10, and may output the obtained first output signal 31 by changing the first image signal 21 having a frame rate of 30 fps.

If it is determined that no error exists in the received second image signal, the electronic device 100 may output the first output signal 31 obtained based on the first image signal 21 and the second image signal 22.

The second output signal 32 may be obtained by merging a plurality of frames included in a first image signal 21 and a plurality of frames included in the second image signal 22 to have the same frame as a plurality of frames included in the original image signal 10.

For example, if the electronic device 100 determines that there is no error in the received second image signal 22, the electronic device 100 may obtain the second output signal 32 having a frame rate of 120 fps by merging the first image signal 21 having a frame rate of 30 fps and the second image signal 22 having a frame rate of 90 fps, and output the obtained second output signal 32.

The first output signal 31 and the second output signal 32 as described above may be synchronized, and the electronic device 100 or an external display device connected to the electronic device 100 may display an output image based on an output signal 40 according to the synchronized first output signal 31 and the second output signal 32.

According to one embodiment as described above, stable output of an image is available through wireless communication by outputting a high resolution image based on the second output signal 32 obtained using the first image signal 21 and the second image signal 22, and outputting an image based on the first output signal 31 obtained by using only the first image signal 21 if there is an error in the second image signal 22 received through a second channel.

Figure 2A:
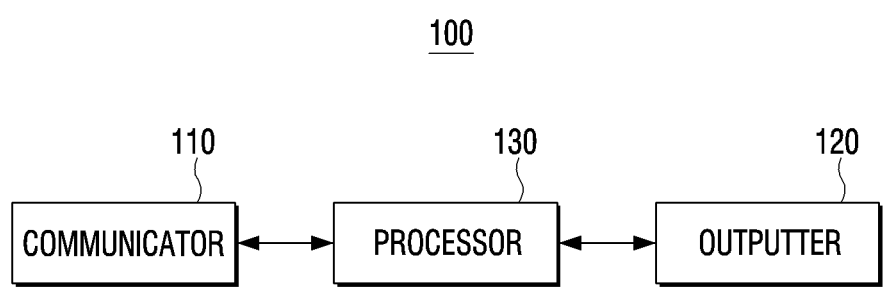
FIG. 2A is a block diagram briefly illustrating a configuration of an electronic device according to an embodiment.
Figure 2B:
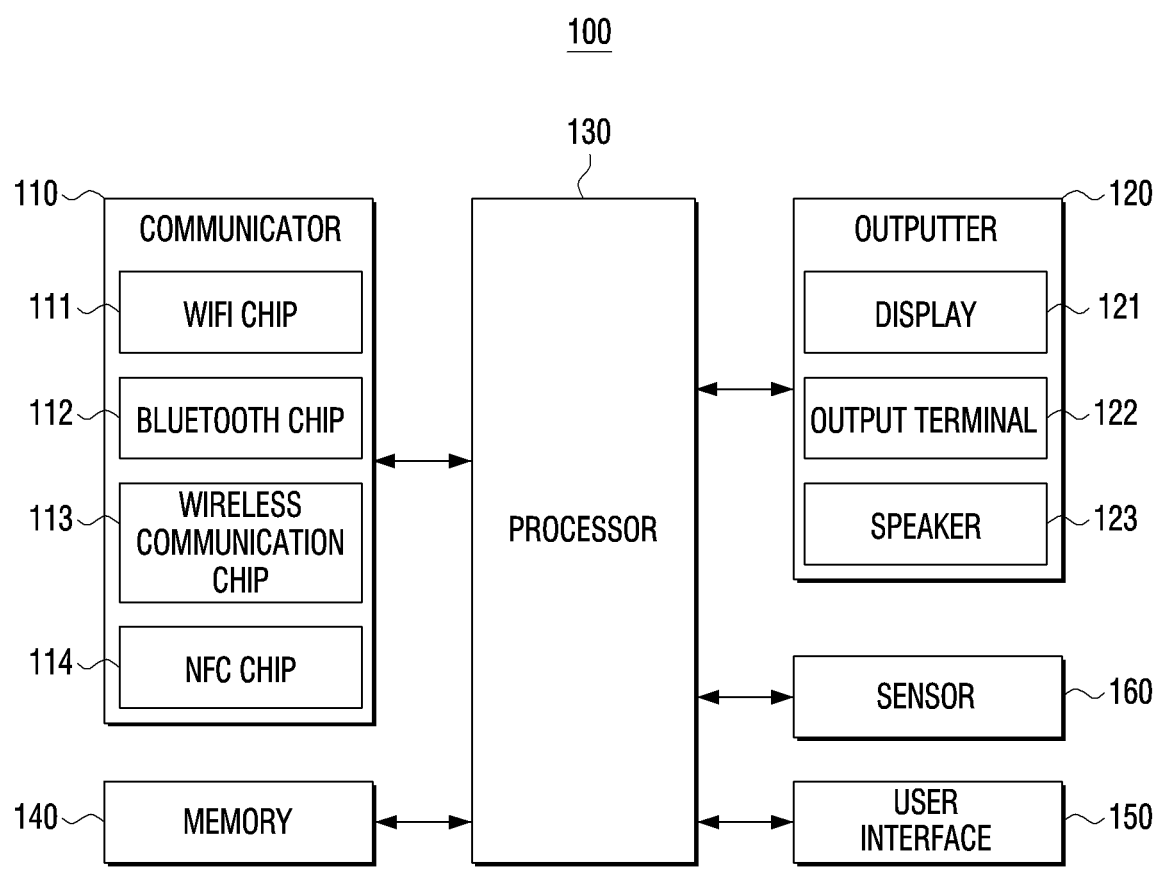
FIG. 2B is a block diagram illustrating a configuration of an electronic device in detail according to an embodiment.

FIG. 2A is a block diagram briefly illustrating a configuration of an electronic device according to an embodiment and FIG. 2B is a block diagram illustrating a configuration of an electronic device in detail according to an embodiment.

Referring to FIG. 2A, the electronic device 100 according to an embodiment includes a communicator 110, an outputter 120, and a processor 130.

The communicator 110 nay perform communication with the external device 200. The communicator 110 may receive an image signal from the external device 200 through the first channel and the second channel.

As illustrated in FIG. 2B, the communicator 110 may include at least one of a Wi-Fi module 111, a Bluetooth module 112, a wireless communication module 113, and a near field communication (NFC) module 114. The Wi-Fi module 111 may communicate by a Wi-Fi method and the Bluetooth module 112 may communicate by a Bluetooth method. The wireless communication module 113 may communicate according to various communication specifications such as IEEE, Zigbee, $3^{rd}$ generation (3G), $3^{rd}$ generation partnership project (3GPP), long term evolution (LTE), or the like.

The NFC module 114 may communicate by the NFC method using a 13.56 MHz band among various RF-ID frequency bands such as 135 kHz, 13.56 MHz, 433 MHz, 860-960 MHz, 2.45 GHz, or the like.

According to various embodiments, the communicator 110 may receive a plurality of image signals separated from an original image through a plurality of channels that do not cause interference with each other. The communicator 110 may communicate with the external device 200 through the first channel for wireless communication of a first frequency bandwidth, and a second channel for wireless communication of a second frequency bandwidth which is higher than the first frequency bandwidth.

For example, the communicator 110 may communicate with the external device 200 through a radio frequency (RF) channel having a frequency bandwidth of 5 GHz and an RF channel having a frequency bandwidth of 60 GHz.

The outputter 120 may output various functions which the electronic device 100 may perform. As shown in FIG. 2B, the outputter may include at least one of a display 121, an output terminal 122, and a speaker 123.

According to various embodiments, the outputter 120 may output a first output signal or a second output signal by the control of the processor 130.

When a first image signal and a second image signal are received through the first channel and the second channel of the communicator 110, the processor 130 may control the outputter 120 to output the first output signal and the second output signal obtained based on the received first image signal and the second image signal.

The first output signal or the second output signal may be synchronized and the display 121 of the electronic device 100 or a display (not shown) of an external display device (not shown) connected to the output terminal 122 of the electronic device 100 may display an output image based on the synchronized first output signal or the second output signal.

If the electronic device 100 is implemented as a display device, such as a digital TV, the processor 130 may control the display 121 to display an output image based on the synchronized first output signal and the second output signal.

If the electronic device 100 is implemented as a device such as a set-top box, the processor 130 may control the output terminal 122 to output the synchronized first output signal and the second output signal so that the output image may be displayed in an external display device (not shown) connected to the electronic device 100.

A specific description of the first output signal and the second output signal will be described below.

The display 121 may be implemented as a liquid crystal display (LCD) panel, organic light emitting diodes (OLED), or the like, and the display 121 may also be implemented as a flexible display, transparent display, or the like according examples. However, the display 121 according to the disclosure is not limited to a specific type.

The output terminal 122 may be configured as an interface of a specification such as high definition multimedia interface (HDMI), but the output terminal 122 according to the disclosure is not limited to a particular type.

The processor 130 controls the overall operation of the electronic device 100. The processor 130 may control the overall operation of the electronic device 100 in connection with the configuration of the electronic device 100 including the communicator 110, the outputter 120, and the memory 140 as described above.

The processor 130 may be implemented in various ways. For example, the processor 130 may be implemented as at least one of an application specific integrated circuit (ASIC), an embedded processor, a microprocessor, a hardware control logic, a hardware finite state machine (FSM), a digital signal processor (DSP), or the like.

The processor 130 may include the ROM, RAM, a graphic processing unit (GPU), CPU, and a bus, and the ROM, RAM, GPU, CPU, or the like, may be interconnected through bus.

According to various embodiments, the processor 130 may receive a first image signal and a second image signal through the communicator 110 and control the outputter 120 to output a first output signal and a second output signal obtained based on the received first image signal and the second image signal.

The processor 130 may receive a first image signal separated from an original image signal through a first channel of the communicator 110 and may receive a second image signal separated from the original image signal through a second channel of the communicator The processor 130 may receive a first image signal separated from the original image signal through a first channel of the communicator 110 and having a first data rate. The processor 130 may receive a second image signal separated from the original image signal through a second channel of the communicator 110 and having a second data rate higher than the first data rate.

The first image signal may have a first frame rate and the second image signal may have a second frame rate higher than the first frame rate. The frame rate refers to the number of frames displayed for one second.

If a first image signal and a second image signal are received, the processor 130 may determine whether an error exists in the second image signal received through the second channel, and control the outputter 120 to output a first output signal or a second output signal obtained based on the received first image signal and the second image signal.

The processor 130 may identify that an error exists in the second image signal if a bit error rate of the second image signal is greater than or equal to a preset ratio.

The second image signal received through the second channel may be composed of an active interval in which pixel data is transmitted and a blank interval in which pixel data is not transmitted. The processor 130 may not identify whether there is an error in the second image signal in an active interval other than the blank interval, and identify whether an error exists in the second image signal in the blank interval.

As described above, if it is identified that there is an error in the second image signal as a result of identifying whether an error exists in the second image signal received through the second channel, the processor 130 may control the outputter 120 to output the second output signal obtained by changing the data rate of the first image signal.

The first output signal may be obtained by inserting an interpolation frame between a plurality of frames included in the first image signal so as to have the same frame rate as the original image signal.

If it is identified that an error exists in the received second image signal, the electronic device 100 may output the first output signal using only the first image signal without using the second image signal.

If it is identified that there is no error in the second image signal, as a result of identifying whether there is an error in the second image signal received through the second channel as described above, the processor 130 may control the outputter 120 to output the first output signal obtained based on the first image signal and the second image signal.

The second output signal may be obtained by merging a plurality of frames included in the first image signal and a plurality of frames included in the second image signal so as to have the same frame as the plurality of frames included in the original image signal.

The first output signal and the second output signal as described above may be synchronized, and the electronic device 100 and an external display device (not shown)

connected to the electronic device 100 may display an output image based on the synchronized first output signal and the second output signal.

The processor 130 may receive the first image signal and the second image signal through the first and second channels of the communicator 110, and control the outputter 120 to output the first output signal or the second output signal obtained based on the received first image signal and the second image signal, but the disclosure is not limited thereto.

According to another embodiment, the communicator 110 may communicate with the external device 200 through a third channel for wireless communication of a third frequency bandwidth, higher than the second frequency bandwidth, as well as a second channel for wireless communication of the second frequency bandwidth higher than the second frequency bandwidth.

The processor 130 may receive a first image signal separated from the original image signal and having the first data rate through the first channel of the communicator 110, receive a second image signal separated from an original image signal through a second channel of the communicator 110 and having a second data rate higher than the first data rate, and may receive a third image signal separated from an original image signal through a third channel of the communicator 110 and having a third data rate higher than the second data rate.

When a first image signal, a second image signal, and a third image signal are received, the processor 130 may first identify whether an error exists in the third image signal received through the third channel before identifying whether there is an error in the second image signal received through the second channel.

If it is identified that no error exists in the third image signal received through the third channel, the processor 130 may control the outputter 120 to output a third output signal obtained based on the first image signal, the second image, and the third image signal.

The third output signal may be obtained by merging a plurality of frames included in the first image signal, a plurality of frames included in the second image signal, and a plurality of frames included in the third image signal so as to have the same frame as the plurality of frames included in the original image signal.

If it is identified that there is an error in the third image signal received through the third channel, the processor 130 may identify whether an error exists in the second image signal received through the second channel as described above, and control the outputter 120 to output the first output signal or the second output signal obtained based on the first image signal and the second image signal.

If it is identified that an error exists in the third image signal received through the third channel and an error does not exist in the second image signal received through the second channel, the processor 130 may control the outputter 120 to output the second output signal obtained based on the first image signal and the second image signal.

If it is identified that an error exists in the third image signal received through the third channel and the second image signal received through the second channel, the processor 130 may control the outputter 120 to output the obtained first output signal by changing the data rate of the first image signal.

As illustrated in FIG. 2B, the electronic device 100 according to the disclosure may further include a memory 140, a user interface 150, and a sensor 160 as well as a communicator, an outputter, and a processor. However, the configuration is illustrative, and a new configuration may be added in addition to such a configuration, or some configurations may be omitted.

At least one command for the electronic device 100 may be stored in the memory 140. An operating system (O/S) for driving the electronic device may be stored in the memory 140. Various software programs or applications for operating the electronic device may be stored in the memory 140 according to various embodiments.

The memory 140 nay store various software modules for operating the electronic device according to various embodiments, and the processor may execute various software modules stored in the memory 140 to control the operation of the electronic device according to various embodiments.

The user interface 150 may receive a user interaction for controlling the overall operation of the electronic device 100. The user interface 150 may be made of a structure such as a camera, a microphone, a remote control signal receiver, or the like. The user interface 150 may be implemented in a form included in a display 121 as a touch screen.

The sensor 160 may detect input of various types. Specifically, the sensor 160 may be a touch sensor for sensing a user's touch. The electronic device 100 may include various sensors such as a motion sensor, a temperature sensor, a humidity sensor, an illuminance sensor, or the like.

Figure 3:
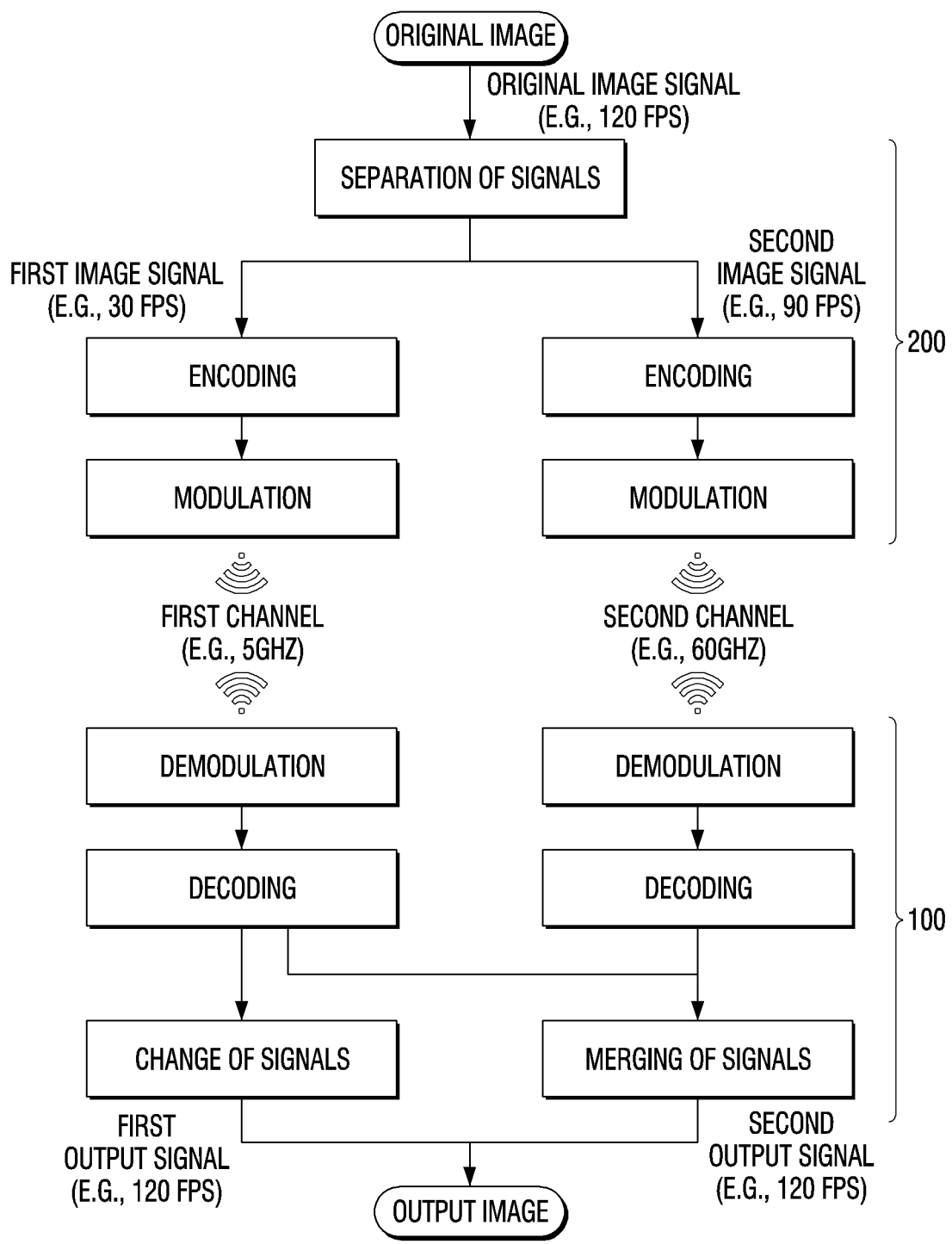
FIG. 3 is a diagram illustrating processes of transmitting and receiving an image signal, changing an image signal, and merging an image signal in detail, according to an embodiment.

FIG. 3 is a diagram illustrating processes of transmitting and receiving an image signal, changing an image signal, and merging an image signal in detail, according to an embodiment.

the configuration of the electronic device 100 has been described above in the description of FIGS. 2A and 2B, and details will be omitted, and the process of processing an image signal by the electronic device 100 and the external device 200 will be described.

As described above, the external device 200 may divide the input original image signal into the first image signal and the second image signal and transmit the same to the electronic device 100.

The electronic device 100 according to one embodiment may receive the first image signal and second image signal from the external device 200, and output the first output signal and the second output signal obtained based on the received first image signal and second image signal.

As illustrated in FIG. 3, processes of separating, encoding, and modulation may be performed in the external device 200.

The external device 200 may separate the input original image signal into first image signal and second image signal. The first image signal may have a first data rate, and the second image signal may have a second data rate higher than the first data rate. The data rate may refer to an amount of data transmitted for one second.

Since the second image signal has a higher data rate than the first image signal, a relatively higher resolution image may be output when the image is outputted based on the second image signal than the first image signal.

The first image signal may have a first frame rate and the second image signal may have a second frame rate higher than the first frame rate. Here, the frame rate refers to the number of frames displayed for one second.

For example, as shown in FIG. 3, the original image signal may have a frame rate of 120 fps. The original image signal having a frame rate of 120 fps may be separated into the first image signal having the frame rate of 30 fps and the second image signal having a frame rate of 90 fps.

The first image signal may have the first pixel data, and the second image signal may have the second pixel data larger than the first pixel data. The pixel data may be RGB data or YCbCr data.

As described above, when one original image signal is separated into a first image signal and a second image signal having different frame rates or pixel data, the separated first image signal and the second image signal have different data rates.

According to the disclosure, the data rate of the first image signal and the second image signal may be determined by various factors within a scope of the disclosure may be achieved. However, for convenience, an example where the second image signal is higher than the first image signal will be described.

The first image signal and the second image signal separated from the original image signal may go through an encoding process and a modulation process. The first image signal and the second image signal may be compressed for efficient transmission within a restricted band and may be modulated so as to have the characteristics of a signal for performing wireless communication.

The first image signal and the second image signal passing through the encoding process and the modulation process may be transmitted to the electronic device 100 through different wireless communication channels that do not interfere with each other. The electronic device 100 may receive the first image signal and the second image signal from the external device 200.

The electronic device 100 may receive the first image signal separated from an original image signal through the first channel and may receive the second image signal separated from the original image signal through the second channel.

The electronic device 100 may receive the first image signal separated from an original image signal through a first channel and having a first data rate and receive a second image signal separated from an original image signal through the second channel and having a second data rate higher than the first data rate.

For example, the electronic device 100 may communicate with the external device 200 via a first channel for wireless communication of a 5 GHz bandwidth and a second channel for wireless communication of a 60 GHz bandwidth. Specifically, the electronic device 100 may receive a first image separated from an original image signal of 120 fps and having a frame rate of 30 fps through a first channel having a bandwidth of 5 GHz bandwidth and may receive, and may receive a second image signal separated from the same image signal of 120 fps having a frame rate of 90 fps through the second channel having 60 GHz bandwidth.

The first image signal and the second image signal received from the external device 200 may go through a decoding process and a de-modulation process. The electronic device 100 may convert the first image signal and the second image signal encoded and modulated in the external device 200 into the original first image signal and the second image signal.

The first image signal and the second image signal going through the decoding process and the de-modulation process may be output as a first output signal or a second output signal through a process of changing a signal or a restoration process of a signal.

The first output signal may be obtained by inserting an interpolation frame between a plurality of frames included in the first image signal so as to have the same frame rate as the original image signal.

The second output signal may be obtained by merging a plurality of frames included in the first image signal and a plurality of frames included in the second image signal so as to have the same frame as the plurality of frames included in the original image signal.

If it is identified that there is an error in the second image signal received through the second channel, the electronic device 100 may control the outputter to output the first output signal obtained by changing the data rate of the first image signal.

In other words, if it is identified that an error exists in the received second image signal, the electronic device 100 may output the first output signal using only the first image signal without using the second image signal.

If it is identified that there is an error in the second imager signal received through the second channel, the electronic device 100 may obtain a first output signal by changing the first image signal through a frame rate conversion (FRC), and output the obtained first output signal.

For example, if it is identified that an error exists in an image signal having a second frame rate of 90 fps received via the second channel, the electronic device 100 may obtain a first output signal having a frame rate of 120 fps equal to the original image signal by changing the frame rate of the first image signal having a frame rate of 30 fps through the frame rate conversion, and output the obtained first output signal. The frame rate conversion is described in the description of FIGS. 6A to 6C.

If it is identified that there is no error in the second image signal received through the second channel, the electronic device 100 may output a second output signal obtained based on the first image signal and the second image signal.

If it is identified that there is no error in the second image signal received through the second channel, the electronic device 100 may merge the first image signal and the second image signal to output the second output signal in which the original image signal is restored.

For example, if it is identified that there is no error in an image signal having a second frame rate of 90 fps received via the second channel, the electronic device 100 may obtain a second output signal having a frame rate of 120 fps by merging a first image signal having a frame rate of 30 fps and a second image signal having a frame rate of 90 fps, and output the obtained second output signal.

The first output signal and the second output signal as described above may be synchronized, and the electronic device 100 or an external display device (not shown) connected to the electronic device 100 may display an output image based on the synchronized first output signal and the second output signal.

Whether the first image signal is output to the first output signal through a frame rate conversion, or to the second output signal through a signal restoration process by merging the first image signal and the second image signal may be determined based on whether an error exists in the second imager signal received through the second channel.

A specific process of identifying an error in the second image signal will be described with reference to FIGS. 4 and 5.

Figure 4:
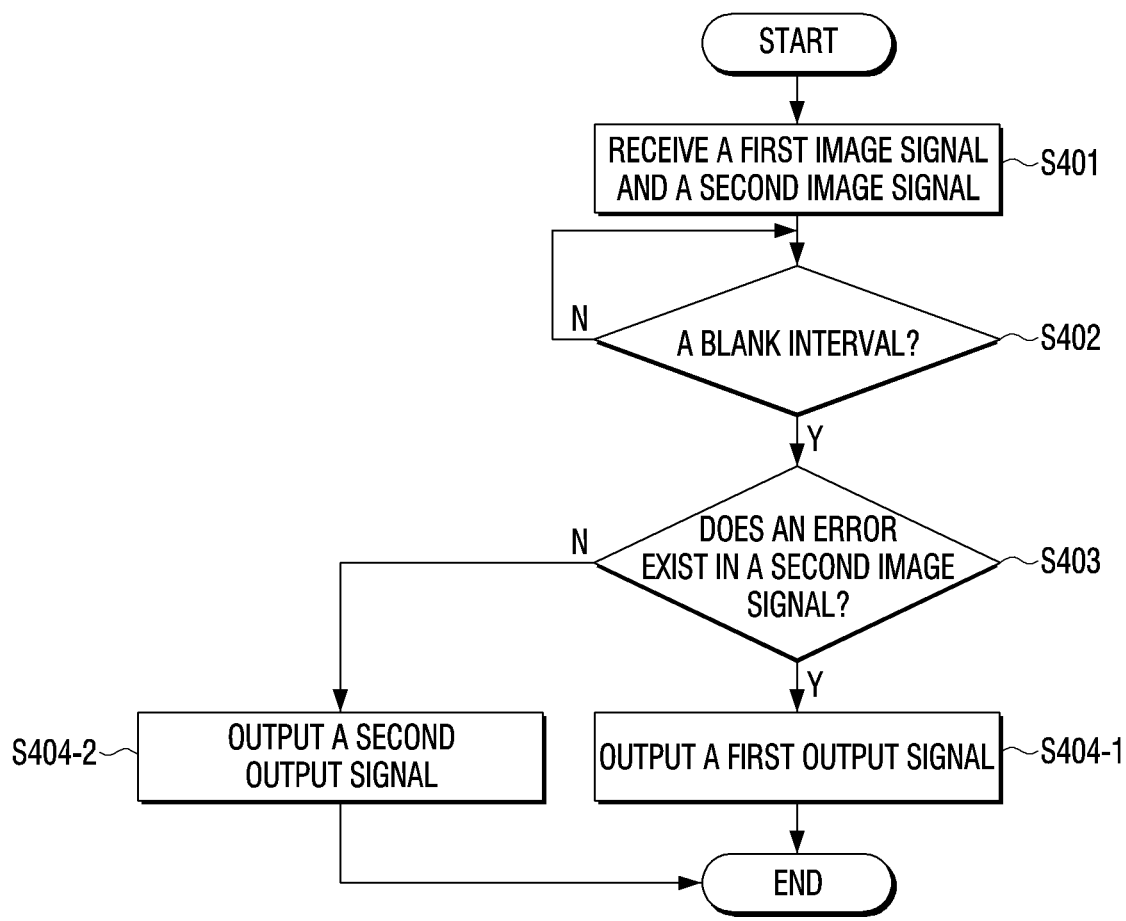
FIGS. 4 and 5 are diagrams illustrating a process of identifying an error in the second image signal in detail, according to an embodiment.
Figure 5:
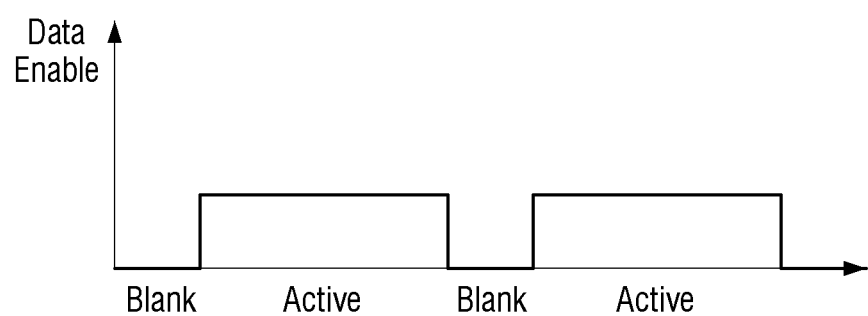

FIGS. 4 and 5 are diagrams illustrating a process of identifying an error in the second image signal in detail, according to an embodiment.

As shown in FIG. 4, the electronic device 100 receives a first image signal and a second image signal in operation S401. As described above, the electronic device 100 may identify whether an error exists in the second image signal received through the second channel.

The electronic device 100 may identify that an error exists in the second image signal if the bit error rate of the second image signal is equal to or greater than the preset ratio.

The second image signal received through the second channel may be formed of an active interval in which pixel data is transmitted and a blank interval in which pixel data is not transmitted, as illustrated in FIG. 5.

The electronic device 100 may not identify whether there is an error in the second image signal in an active interval other than the blank interval in operation S402-N, and may identify determines whether an error exists in the second image signal in the blank interval in operation S402-Y.

If it is identified that there is an error in the second image signal received through the second channel in operation S403-Y, the electronic device 100 may output the first output signal obtained by changing the data rate of the first image signal in operation S404-1.

If it is identified that there is no error in the second image signal received through the second channel in operation S403-N, the electronic device 100 may output a first output signal obtained based on the first image signal and the second image signal in operation S404-2.

As described above, according to the disclosure, by outputting an image based on the first output signal obtained using only a first image signal when there is an error in the second image signal received through the second channel, while outputting a high-resolution image based on the second output signal obtained using the first image signal and the second image signal, stable output of an image through wireless communication is available.

The process of identifying an error as described above may be performed in the blank interval, and the first output signal or the second output signal may be selected and outputted in real time according to the identification result, so that the high-resolution image may be stably outputted without disconnection.

Figure 6A:
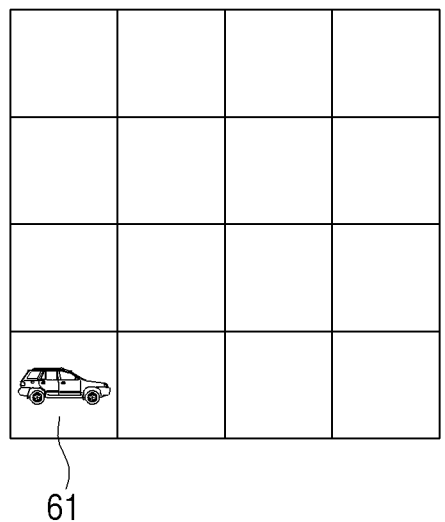
FIGS. 6A, 6B, and 6C are diagrams illustrating a process for changing a frame rate according to an embodiment.
Figure 6B:
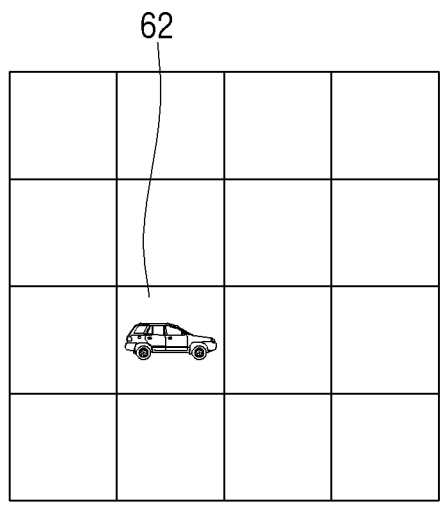
Figure 6C:
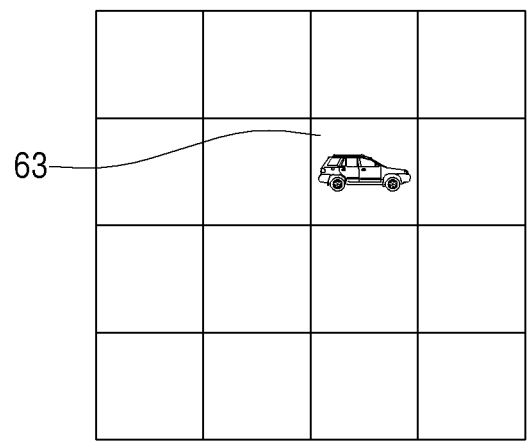

FIGS. 6A to 6C are diagrams illustrating a process for changing a frame rate according to an embodiment.

As described above, a first image signal according to the disclosure may be separated from an original image signal and may have a first frame rate. The second image signal may be separated from the original image signal and may have a second frame rate higher than the first frame rate.

If it is identified that an error exists in the second image signal received through the second channel, the electronic device 100 may obtain a first output signal by changing the first image signal through the FRC, and may output the obtained first output signal.

For example, if it is identified that an error is present in the image signal having the second frame rate of 90 fps received through the second channel, the electronic device 100 may obtain a first output signal having a frame rate of 120 fps equal to the original image signal by changing a first image signal having a frame rate of 30 fps, and output the obtained first output signal.

The first output signal may be obtained by inserting an interpolation frame between a plurality of frames included in the first image sign al so as to have the same frame rate as the original image signal.

Referring to FIGS. 6A to 6C, a vehicle may be located in a first block 61 in the frame of FIG. 6A, and may be located in a third block 63 in the frame of FIG. 6C. The vehicle in the frame of FIG. 6B may be located in a second block 62 corresponding to an intermediate state of the frame of FIG. 6A and the frame of FIG. 6C.

In this example, the electronic device 100 may change the frame rate of the first image signal by inserting an interpolation frame as shown in FIG. 6B between the frame of FIG. 6A and the frame of FIG. 6C.

It has been described that one interpolation frame is inserted between two frames, but the number of interpolation frames inserted between two frames may vary depending on the frame rate of the original image signal and the first image signal.

For example, if the original image signal has a frame rate of 120 fps, and the first image signal has a frame rate of 30 fps, the electronic device 100 may obtain a first output signal having a frame rate of 120 fps by inserting three interpolation frames between consecutive two frames among the plurality of frames included in the first image signal.

In obtaining the interpolation frame as described above, motion estimation and motion compensation techniques may be applied. The motion estimation may refer to estimating a motion or displacement vector to locate a matched block of a reference frame in a current block. The motion compensation refers to actually aligning a block in a reference frame to a matching block in a current frame.

When a frame rate of a first image signal is changed by applying a motion estimation or motion compensation technique as described above, a motion blur phenomenon of an output image according to the first output image signal may be minimized.

As described above, if it is identified that an error exists in the second image signal received through the second channel, the electronic device 100 may output the first output signal obtained by changing the frame rate of the first image signal.

If there is an error in the second image signal received through the second channel, an image of relatively higher resolution than an example of using a first image signal before changing to the first output signal may be output by outputting the first output signal obtained by changing the frame rate of the first image signal instead of outputting an image without changing the first image signal.

Figure 7:
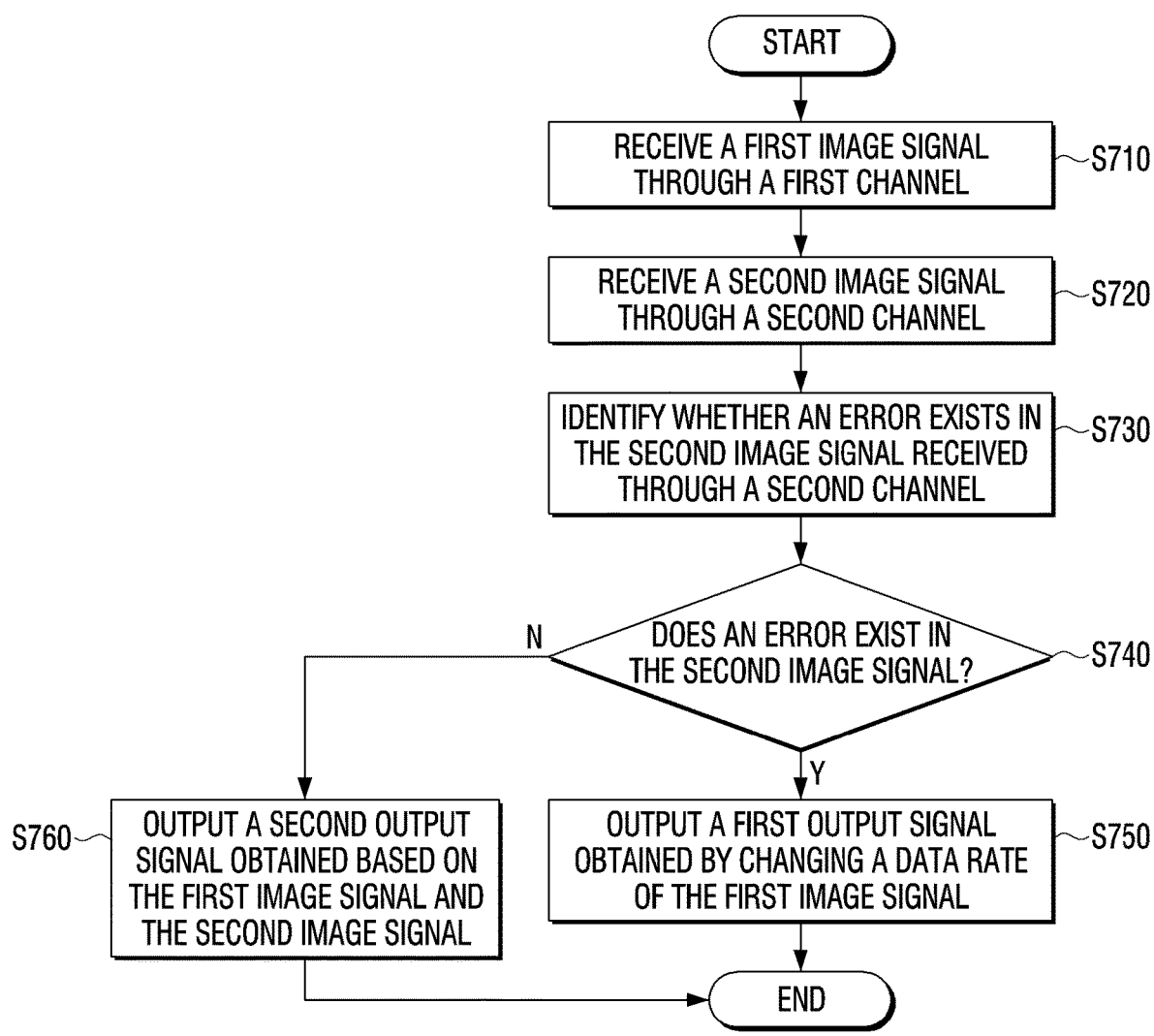
FIG. 7 is a flowchart illustrating a controlling method of an electronic device according to an embodiment.

FIG. 7 is a flowchart illustrating a controlling method of an electronic device according to an embodiment.

As shown in FIG. 7, according to the controlling method of the electronic device 100, the electronic device 100 may receive a first image signal through a first channel in operation S710 and receive a second image signal through a second channel in operation S720.

The electronic device 100 may receive a first image signal separated from an original image signal through a first channel and receive a second image signal separated from the original image signal same as the first image signal through a second channel.

The electronic device 100 may receive a first image signal which is separated from an original image signal through a first channel for wireless communication of a first frequency bandwidth, and has a first data rate.

The electronic device 100 may receive a second image signal separated from the original image signal equal to the first image signal and having a second data rate higher than the first data rate through a second channel for wireless communication of a second frequency bandwidth that is higher than the first frequency bandwidth.

The first image signal may have a first frame rate, and the second image signal may have a second frame rate higher than the first frame rate.

If a first image signal and a second image signal are received, the electronic device 100 may identify whether an error exists in the second image signal received on the second channel in operation S730.

Specifically, the electronic device 100 may identify whether an error exists in a second image signal in a blank interval where pixel data is not transmitted. The electronic device 100 may identify that an error exists in the second image signal if the bit error rate of the second image signal is equal to or greater than the preset ratio.

If it is identified that an error exists in the second image signal received through the second channel in operation S740-Y, the electronic device 100 may output a first output signal obtained by changing the data rate of the first image signal in operation S750.

The first output signal may be obtained by inserting an interpolation frame between a plurality of frames included in the first image signal so as to have the same frame rate as the original image signal.

If it is identified that there is no error in the second image signal received through the second channel in operation S740-N, the first output signal obtained based on the first image signal and the second image signal is outputted in operation S760.

The second output signal may be obtained by merging a plurality of frames included in the first image signal and a plurality of frames included in the second image signal so as to have the same frame as the plurality of frames included in the original image signal.

The first output signal and the second output signal as described above may be synchronized, and the electronic device 100 or an external display device connected to the electronic device 100 may display an output image based on the synchronized first output signal and the second output signal.

The step of receiving a first image signal in operation S710 and a step of receiving the second image signal in operation S720 are described separately, but this is only to clearly illustrate that the first image signal and the second image signal are received through the first channel and the second channel, and there is no particular time series element between the two operations.

If it is within the scope of achieving the purpose of the disclosure, the temporal order of the operations as described above may be changed and two or more of the operations as described above may be performed simultaneously.

The controlling method of the electronic device 100 according to an embodiment described above may be implemented as a program and provided to the electronic device 100. A program including the controlling method of the electronic device 100 may be stored in a non-transitory readable medium and provided.

A non-transitory computer-readable medium refers to a medium that stores data semi-permanently, rather than a medium that stores data for a short moment, such as a register, cache, memory, etc., and refers to a medium readable by a device. Specifically, the programs for performing the various methods described above may be stored and provided in a non-transitory readable medium, such as a compact disc (CD), a digital video disc (DVD), a hard disk, a Blu-ray disc, a universal serial bus (USB), a memory card, a read-only memory (ROM), etc.

While the disclosure has been shown and described with reference to various example embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communicator configured to perform wireless communication with an external device through a first channel having a first frequency bandwidth and a different second channel having a second frequency bandwidth greater than the first frequency bandwidth; and
a processor configured to:
receive a first image signal separated from an original image signal, through the first channel, a first frame rate of the first image signal being less than a frame rate of the original image signal;
receive a second image signal separated from the original image signal, through the second channel, a second frame rate of the second image signal being less than the frame rate of the original image signal, wherein the second frame rate of the second image signal is higher than the first frame rate of the first image signal;
identify whether an error exists in the second image signal;
based on identifying that an error exists in the second image signal, obtain a first output signal, having a frame rate which is the same as the frame rate of the original image signal, by inserting an interpolation frame between a plurality of frames included in the first image signal and control to output the obtained first output signal; and
based on identifying that an error does not exist in the second image signal, obtain a second output signal, having a frame rate which is the same as the frame rate of the original image signal, by merging the plurality of frames included in the first image signal and a plurality of frames included in the second image signal and control to output the obtained second output signal,
wherein the interpolation frame is obtained based on estimating displacement vectors between the plurality of frames included in the first image signal.

2. The electronic device of claim 1,
wherein the first image signal has a first data rate, and the second image signal has a second data rate higher than the first image signal.

3. The electronic device of claim 2, wherein the second image signal comprises second pixel data larger than first pixel data of the first image signal.

4. The electronic device of claim 1, wherein the second image signal comprises an active interval in which pixel data is transmitted and a blank interval in which the pixel data is not transmitted,
wherein the processor is configured to identify whether an error exists in the second image signal in the blank interval.

5. The electronic device of claim 1, wherein the processor is configured to, based on a bit error rate of the second image signal being greater than or equal to a preset ratio, identify that an error exists in the second image signal.

6. The electronic device of claim 1, wherein the communicator performs communication with the external device through a third channel for wireless communication of a third frequency bandwidth larger than the second bandwidth, and the second channel,
wherein the processor is configured to:
receive a third image signal separated from the original image signal through a third channel of the communicator and having a third data rate higher than the second data rate, identify whether an error exists in the third image signal, based on identifying that an error does not exist in the third image signal, control to output a third output signal obtained by merging the first image signal, the second image signal, and the third image signal and having the same frame rate as the original image signal, based on identifying that an error exists in the third image signal and an error does not exist in the second image signal, control to output a second output signal obtained by merging the first image signal and the second image signal and having the same frame rate as the original image signal, and based on identifying that an error exists in the third image signal and an error exists in the second image signal-, control to output a first output signal obtained by increasing a frame rate of the first image signal to have the same frame rate as the original image signal.

7. A method of controlling an electronic device, the method comprising:

receiving a first image signal separated from an original image signal, through a first channel for wireless communication having a first frequency bandwidth, a first frame rate of the first image signal being less than a frame rate of the original image signal;

receiving a second image signal separated from the original image signal, through a second channel for wireless communication having a second frequency bandwidth greater than the first frequency bandwidth, a second frame rate of the second image signal being less than the frame rate of the original image signal, wherein the second frame rate of the second image signal is higher than the first frame rate of the first image signal;

identifying whether an error exists in the second image signal;

based on identifying that an error exists in the second image signal, obtaining a first output signal, having a frame rate which is the same as the frame rate of the original image signal, by inserting an interpolation frame between a plurality of frames included in the first image signal and outputting the obtained first output signal; and based on identifying that an error does not exist in the second image signal, obtaining a second output signal, having a frame rate which is the same as the frame rate of the original image signal, by merging the plurality of frames included in the first image signal and a plurality of frames included in the second image signal and outputting the obtained second output signal, wherein the interpolation frame is obtained based on estimating displacement vectors between the plurality of frames included in the first image signal.

8. The method of claim 7, wherein the first image signal has a first data rate, and the second image signal has a second data rate higher than the first image signal.

9. The method of claim 7, wherein the second image signal comprises an active interval in which pixel data is transmitted and a blank interval in which the pixel data is not transmitted, wherein the identifying comprises identifying whether an error exists in the second image signal in the blank interval.

10. The method of claim 7, wherein the identifying comprises, based on a bit error rate of the second image signal being greater than or equal to a preset ratio, identifying that an error exists in the second image signal.

11. A non-transitory computer-readable storage medium storing a program which, when executed by a processor of an electronic device, configures the processor to control the electronic device to perform operations comprising:

receiving a first image signal separated from an original image signal, through a first channel for wireless communication having a first frequency bandwidth, a first frame rate of the first image signal being less than a frame rate of the original image signal;

receiving a second image signal separated from the original image signal, through a second channel for wireless communication having a second frequency bandwidth greater than the first frequency bandwidth, a second frame rate of the second image signal being less than the frame rate of the original image signal, wherein the second frame rate of the second image signal is higher than the first frame rate of the first image signal;

identifying whether an error exists in the second image signal;

based on identifying that an error exists in the second image signal, obtaining a first output signal, having a frame rate which is the same as the frame rate of the original image signal, by inserting an interpolation frame between a plurality of frames included in the first image signal and outputting the obtained first output signal; and based on identifying that an error does not exist in the second image signal, obtaining a second output signal, having a frame rate which is the same as the frame rate of the original image signal, by merging the plurality of frames included in the first image signal and a plurality of frames included in the second image signal and outputting the obtained second output signal, wherein the interpolation frame is obtained based on estimating displacement vectors between the plurality of frames included in the first image signal.

* * * * *